(12) United States Patent
Yamaoka et al.

(10) Patent No.: US 10,551,576 B2
(45) Date of Patent: Feb. 4, 2020

(54) OPTICAL FIBER FIXING STRUCTURE

(71) Applicant: FURUKAWA ELECTRIC CO., LTD., Tokyo (JP)

(72) Inventors: Kazuki Yamaoka, Tokyo (JP); Jun Miyokawa, Tokyo (JP); Masakazu Miura, Tokyo (JP); Toshio Kimura, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 34 days.

(21) Appl. No.: 15/416,619

(22) Filed: Jan. 26, 2017

(65) Prior Publication Data
US 2017/0139161 A1 May 18, 2017

Related U.S. Application Data

(63) Continuation of application No. PCT/JP2016/053411, filed on Feb. 4, 2016.

(30) Foreign Application Priority Data

Feb. 13, 2015 (JP) .................................. 2015-026930

(51) Int. Cl.
G02B 6/00 (2006.01)
G02B 6/42 (2006.01)
(Continued)

(52) U.S. Cl.
CPC ......... G02B 6/4216 (2013.01); G02B 6/2793 (2013.01); G02B 6/3812 (2013.01);
(Continued)

(58) Field of Classification Search
CPC .... G02B 6/4216; G02B 6/2793; G02B 6/423; G02B 6/4239; G02B 6/4243; G02B 6/4253; G02B 6/4257; G02F 1/0134
(Continued)

(56) References Cited

U.S. PATENT DOCUMENTS 4,907,853 A * 3/1990 Hiratsuka ............ G02B 6/3812
385/123
5,127,072 A * 6/1992 Blauvelt .............. G02B 6/4208
372/38.09
(Continued)

FOREIGN PATENT DOCUMENTS

CN  201681179 U  12/2010
JP  62-100711     5/1987
(Continued)

OTHER PUBLICATIONS

International Search Report dated May 10, 2016 in PCT/JP2016/053411, filed on Feb. 4, 2016 ( with English Translation).

(Continued)

*Primary Examiner* — Thomas A Hollweg
*Assistant Examiner* — Guy G Anderson
(74) *Attorney, Agent, or Firm* — Oblon, McClelland, Maier & Neustadt, L.L.P.

(57) ABSTRACT

An optical fiber fixing structure includes: a cylindrical member; an optical fiber inserted into a hole of the cylindrical member; and a fixing material configured to fix the cylindrical member and the optical fiber, wherein the optical fiber is a polarization maintaining optical fiber having a polarization axis, and a center of the optical fiber is arranged so as to be eccentric to a center of the hole, and an angle formed by an eccentric direction connecting the center of the hole and the center of the optical fiber and the polarization axis is −22.5° to 22.5°, or 67.5° to 112.5°.

7 Claims, 10 Drawing Sheets

(51) Int. Cl.
*G02B 6/27* (2006.01)
*G02F 1/01* (2006.01)
*G02B 6/38* (2006.01)

(52) U.S. Cl.
CPC ........... *G02B 6/423* (2013.01); *G02B 6/4239* (2013.01); *G02B 6/4243* (2013.01); *G02B 6/4253* (2013.01); *G02B 6/4267* (2013.01); *G02F 1/0134* (2013.01); *G02B 6/4248* (2013.01)

(58) Field of Classification Search
USPC ............................................. 385/11, 135–137
See application file for complete search history.

(56) References Cited

U.S. PATENT DOCUMENTS

| | | | | |
|---|---|---|---|---|
| 5,305,413 | A | 4/1994 | Payne | |
| 5,633,970 | A * | 5/1997 | Olson | G02B 6/3812 385/147 |
| 5,692,081 | A * | 11/1997 | Takahashi | G02B 6/2937 385/60 |
| 5,812,258 | A * | 9/1998 | Pierson | G02B 6/4226 356/153 |
| 5,946,436 | A * | 8/1999 | Takashi | G02B 6/3843 385/60 |
| 6,295,393 | B1 * | 9/2001 | Naganuma | G02B 6/2713 385/11 |
| 6,744,939 | B2 * | 6/2004 | Lampert | G02B 6/3812 385/11 |
| 6,758,602 | B2 * | 7/2004 | Yamaguchi | G02B 6/381 385/78 |
| 6,782,011 | B2 * | 8/2004 | Kusano | G02B 6/105 372/6 |
| 6,865,006 | B2 * | 3/2005 | Sakane | G02B 6/4208 359/251 |
| 6,920,255 | B2 * | 7/2005 | Hasui | G02B 6/264 385/11 |
| 6,935,791 | B2 * | 8/2005 | Ban | G02B 6/4214 385/52 |
| 6,973,223 | B2 * | 12/2005 | Huang | G02B 6/2551 250/227.17 |
| 7,052,188 | B2 * | 5/2006 | Manning | G02B 6/3812 385/56 |
| 7,267,492 | B2 * | 9/2007 | Ikeda | G02B 6/4201 385/88 |
| 7,284,914 | B2 * | 10/2007 | Marazzi | G02F 1/0107 385/92 |
| 7,322,751 | B2 * | 1/2008 | Hurt | G02B 6/4226 385/55 |
| 7,493,007 | B2 | 2/2009 | Tamiya | |
| 9,470,847 | B2 * | 10/2016 | Grinderslev | G02B 6/3812 |
| 2002/0129623 | A1 | 9/2002 | Nonomura et al. | |
| 2002/0141717 | A1 * | 10/2002 | Inaba | C03B 37/01217 385/123 |
| 2007/0230857 | A1 * | 10/2007 | Tamiya | G02B 6/4248 385/11 |
| 2008/0107382 | A1 | 5/2008 | Griffin | |
| 2015/0079983 | A1 * | 3/2015 | Prakash | H04W 8/186 455/435.1 |

FOREIGN PATENT DOCUMENTS

| | | |
|---|---|---|
| JP | 62-299918 | 12/1987 |
| JP | 2-64508 | 3/1990 |
| JP | 6-67038 | 3/1994 |
| JP | 2002-40291 | 2/2002 |
| JP | 2007-264346 | 10/2007 |

OTHER PUBLICATIONS

Written Opinion dated May 10, 2016 in PCT/JP2016/053411, filed on Feb. 4, 2016.
Extended European Search Report issued in European Patent Application No. 16749149.7 dated Jul. 13, 2018.
Office Action issued in corresponding Chinese Application No. 2016/80002100.5 dated Apr. 3, 2019, 15 pages.
Chinese Office Action dated Nov. 19, 2019 in Chinese Application No. 201680002100.5, 9 pages, with English Machine Translation.

* cited by examiner

FIG.7

| | Dp [mm] | L [mm] | 2L/Dp | θ [°] | EXTINCTION RATIO VARIATION AMOUNT [dB] |
|---|---|---|---|---|---|
| EXAMPLE 1 | 0.5 | 0.1775 | 0.7100 | 2 | -0.5 |
| EXAMPLE 2 | 0.5 | 0.1775 | 0.7100 | 10 | -1.5 |
| COMPARATIVE EXAMPLE 1 | 0.5 | 0.1775 | 0.7100 | 30 | -7.5 |
| EXAMPLE 3 | 0.5 | 0.0875 | 0.3500 | 20 | -0.8 |
| COMPARATIVE EXAMPLE 2 | 0.5 | 0.0375 | 0.1500 | 40 | -6.2 |

OPTICAL FIBER FIXING STRUCTURE

CROSS-REFERENCE TO RELATED APPLICATIONS

This application is a continuation of International Application No. PCT/JP2016/053411, filed on Feb. 4, 2016, which claims the benefit of priority from Japanese Patent Application No. 2015-026930, filed on Feb. 13, 2015, the entire contents of which are incorporated herein by reference.

BACKGROUND

The present disclosure relates to an optical fiber fixing structure.

A semiconductor laser module outputting light from an optical fiber has an optical fiber fixing structure in which the optical fiber is inserted into and fixed to a metal pipe fixed to a semiconductor laser module package. The metal pipe and the optical fiber are fixed with an adhesive such as low melting point glass and hermetically sealed. Here, the thermal expansion coefficients of the metal pipe and the low melting point glass are larger than that of the optical fiber. Thus, stress is applied on the optical fiber.

Moreover, there is disclosed a polarization maintaining optical fiber that propagates light while maintaining the polarization plane of the light. The polarization maintaining optical fiber has a core and a cladding that is formed on the outer periphery of the core and includes a pair of stress imparting parts arranged in lateral regions to the core. In this polarization maintaining optical fiber, the stress imparting parts impart stress to the core, and a birefringence phenomenon due to stress is used to maintain a polarization plane. In such a stress imparting type polarization maintaining optical fiber, when stress is applied from the outside, stress imparted to the core is changed, which may deteriorate a polarization extinction ratio.

That is, the optical fiber fixing structure of a semiconductor laser module using a polarization maintaining optical fiber has a problem in that stress is applied on the optical fiber and a polarization extinction ratio is deteriorated. Then, there are disclosed structures that reduce stress applied to the polarization maintaining optical fiber from the outside and suppress deterioration of a polarization extinction ratio (see Japanese Laid-open Patent Publication No. 62-299918, Japanese Laid-open Patent Publication No. 2007-264346 and Japanese Laid-open Patent Publication No. 6-67038, for example).

However, birefringence is considerably sensitive to stress, and there has been a problem in that a polarization extinction ratio is deteriorated when the polarization maintaining optical fiber deviates from the center of a hole of a metal pipe.

There is a need for an optical fiber fixing structure in which the deterioration of a polarization extinction ratio is suppressed.

SUMMARY

An optical fiber fixing structure according to one aspect of the present disclosure includes: a cylindrical member; an optical fiber inserted into a hole of the cylindrical member; and a fixing material configured to fix the cylindrical member and the optical fiber, wherein the optical fiber is a polarization maintaining optical fiber having a polarization axis, and a center of the optical fiber is arranged so as to be eccentric to a center of the hole, and an angle formed by an eccentric direction connecting the center of the hole and the center of the optical fiber and the polarization axis is −22.5° to 22.5°, or 67.5° to 112.5°.

The above and other objects, features, advantages and technical and industrial significance of this disclosure will be better understood by reading the following detailed description of the disclosure, when considered in connection with the accompanying drawings.

BRIEF DESCRIPTION OF THE DRAWINGS

FIG. 7 is a diagram illustrating extinction ratio variation amounts of optical fiber fixing structures according to examples and comparative examples;

DETAILED DESCRIPTION

Figure 1:
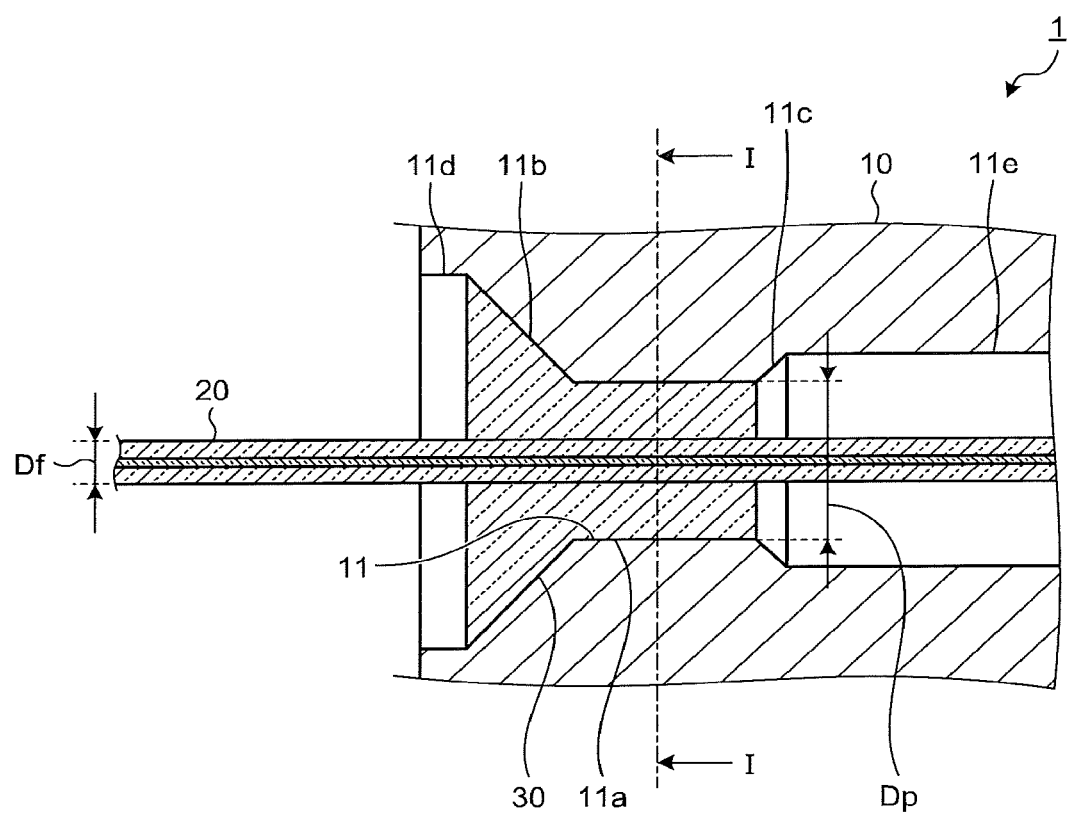
FIG. 1 is a schematic view illustrating a section of an optical fiber fixing structure according to an embodiment of the disclosure.

The following will describe an embodiment of an optical fiber fixing structure according to the disclosure with reference to the enclosed drawings. Note that the embodiment does not limit the disclosure. In the drawings, the same or corresponding elements are appropriately represented with the same symbols. The drawings are illustrated schematically, and it should be noted that the size relation of the elements, the proportion of the elements, and the like may be different from actual implementations. Also among drawings, parts mutually different in size relation or proportion may be included.

Embodiment

An optical fiber fixing structure according to an embodiment of the disclosure will be described first. FIG. 1 is a schematic view illustrating a section of an optical fiber fixing structure according to an embodiment of the disclosure. As illustrated in FIG. 1, an optical fiber fixing structure 1 includes a metal pipe 10 as a cylindrical member, an optical fiber 20 inserted into a hole 11 of the metal pipe 10, and low melting point glass 30 as a fixing material that fixes the metal pipe 10 and the optical fiber 20. Note that FIG. 1 is an enlarged view of the optical fiber fixing structure 1, and omits the illustration of the upper and the lower sides and the right side of the metal pipe 10.

Here, the low melting point glass 30 indicates glass that softens at 600° C. or lower.

A thermal expansion coefficient of the metal pipe 10 is larger than a thermal expansion coefficient of the low melting point glass 30. The thermal expansion coefficient of the low melting point glass 30 is larger than a thermal expansion coefficient of the optical fiber 20. Thus, the metal pipe 10 and the low melting point glass 30 apply stress on the optical fiber 20 to caulk it, so that the optical fiber 20 is fixed to the metal pipe 10 and the hole 11 is hermetically sealed.

Here, hermetically sealing indicates the state in which the package inner space is in an inert gas atmosphere such as $N_2$ and the inert gas does not leak at a temperature of −20° C. to 75° C.

The metal pipe 10 has the hole 11 extending in a longitudinal direction. The hole 11 has a small diameter portion 11a at which a diameter of the hole 11 is constant and smaller than the other parts, and has, on both sides of the small diameter portion 11a, diameter enlarged portions 11b, 11c at which the diameter of the hole 11 gradually enlarges along a direction away from the small diameter portion 11a. Moreover, the hole 11 includes parallel portions 11d, 11e having a constant hole diameter on both sides of the diameter enlarged portions 11b, 11c. That is, as illustrated in FIG. 1, the small diameter portion 11a is a part with the smallest diameter in the hole 11 in the part where the metal pipe 10 and the optical fiber 20 are fixed. A diameter Dp of the small diameter portion 11a may be twice or larger than a diameter Df of the optical fiber 20 but not exceeding eight times of the diameter Df. For example, when the diameter Df of the optical fiber 20 is 125 μm, the diameter Dp of the small diameter portion 11a may be 250 μm or larger but not exceeding 1000 μm. This is because with an excessively small diameter portion 11a, stress applied on the optical fiber 20 from the metal pipe 10 and the low melting point glass 30 becomes excessively large, which leads to the deterioration of a polarization extinction ratio. Moreover, when the small diameter portion 11a is excessively large, it becomes difficult to form the low melting point glass 30 at a desired position in manufacturing. The length of the small diameter portion 11a may be 0.5 mm or larger, for example. It is because with an excessively short small diameter portion, the hole 11 may not be hermetically sealed sufficiently. Note that the cylindrical member may be formed of a material other than metal, and the material is not especially limited. The diameter enlarged portions 11b, 11c formed on both sides of the small diameter portion 11a facilitate the formation of the low melting point glass 30 at a desired position in manufacturing, and thus the hole 11 may be hermetically sealed easily.

Figure 2:
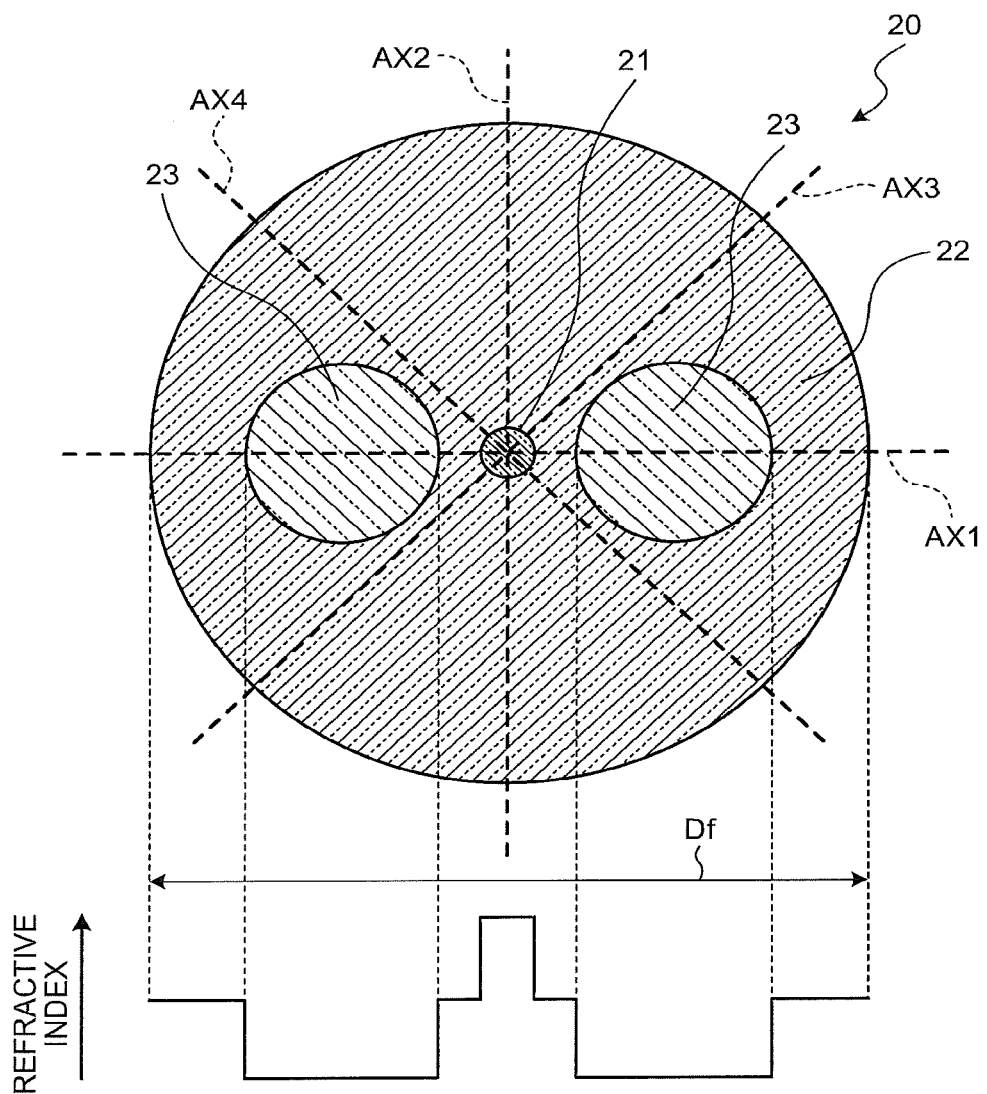
FIG. 2 is a schematic view illustrating a cross-section of an optical fiber illustrated in FIG. 1.

The optical fiber 20 is a polarization maintaining optical fiber having a polarization plane. FIG. 2 is a schematic view illustrating a cross-section of the optical fiber illustrated in FIG. 1. As illustrated in FIG. 2, the optical fiber 20 has a core 21 and a cladding 22 that is formed on an outer periphery of the core 21 and includes a pair of stress imparting parts 23 arranged axisymmetrically relative to a symmetrical axis (axis AX2) passing the center of the core 21. The optical fiber 20 is a stress imparting type polarization maintaining optical fiber using a birefringence phenomenon due to stress, and the stress imparting parts 23 impart stress to the core 21 so as to maintain a polarization plane. The diameter Df of the optical fiber 20 is 125 μm, for example.

Note that in the specification, the polarization plane in a section of the polarization maintaining optical fiber is referred to as a polarization axis.

The core 21 is formed of silica glass ($SiO_2$) to which a dopant such as germanium ($GeO_2$) increasing a refractive index is added. The cladding 22 is formed of pure silica glass in which dopant for adjusting a refractive index is not added, and has a smaller refractive index than the core 21.

The stress imparting parts 23 are formed of silica glass containing an additive such as boron ($B_2O_3$). $B_2O_3$ has a larger thermal expansion ratio than $SiO_2$. Thus, when the optical fiber is cooled and solidified in drawing of a glass preform including the stress imparting parts 23 by heating and melting it at a high temperature, the stress imparting parts 23 imparts stress to the core 21. Such stress causes birefringence at the core 21, whereby polarization maintaining characteristics are obtained.

The stress from the stress imparting parts 23 is largest in a direction along an axis AX1 orthogonal to a symmetrical axis of two stress imparting parts 23, and is smallest in a direction along the axis AX2 parallel to the symmetrical axis of two stress imparting parts 23. As a result, birefringence occurs, and the optical fiber 20 becomes a polarization maintaining optical fiber maintaining polarization of light having polarization along the axis AX1 or the axis AX2. That is, the optical fiber 20 has two polarization axes of the axis AX1 that is the first polarization axis and the axis AX2 that is the second polarization axis.

The low melting point glass 30 fixes the metal pipe 10 and the optical fiber 20, and hermetically seals the hole 11 to improve the reliability of the semiconductor laser module. The fixing material is not limited to low melting point glass. It can be a material the crystal structure of which is an amorphous structure, such as $V_2O_5$, $P_2O_5$, $TeO_2$, $Fe_2O_3$, and $SiO_2$, or epoxy resin.

Figure 3:
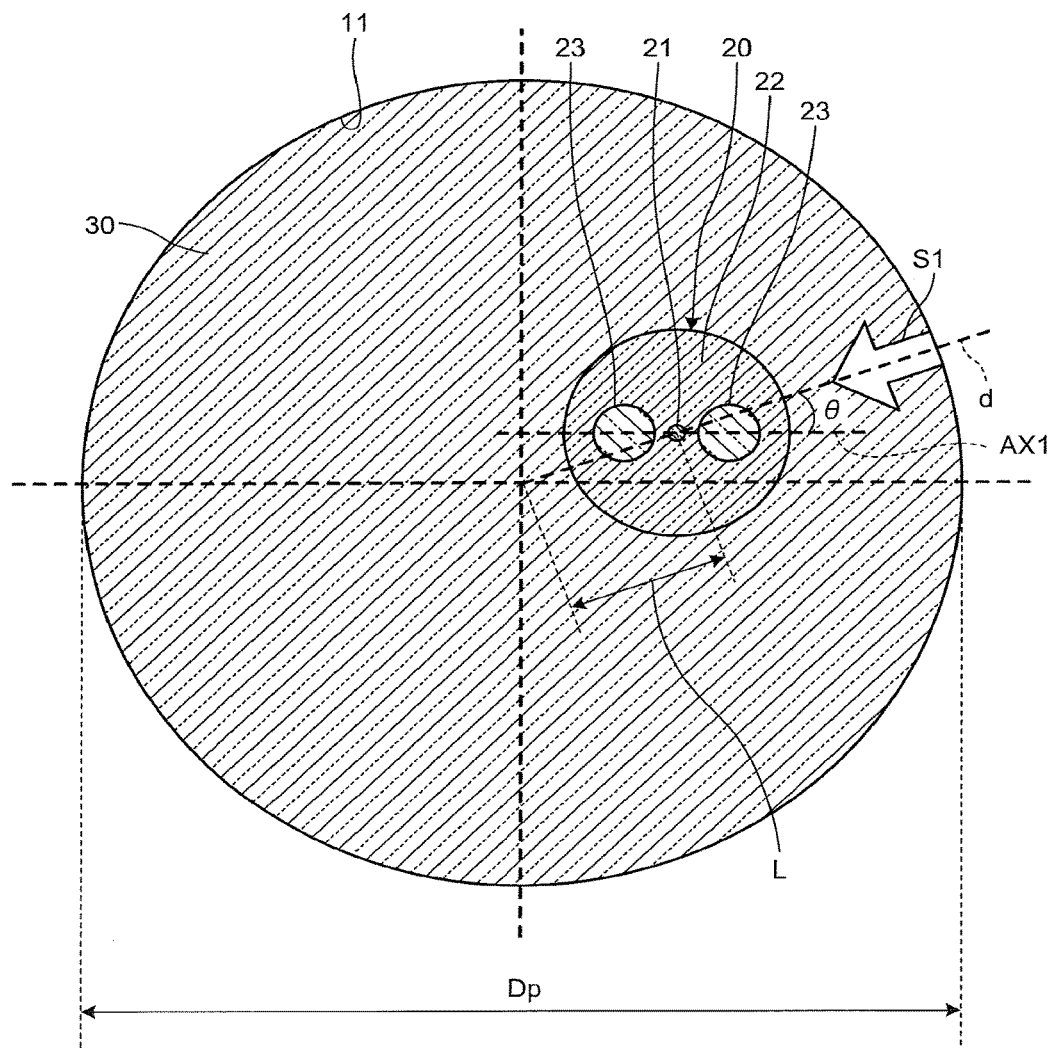
FIG. 3 is a schematic view illustrating a part of a cross-section along line I-I of FIG. 1.

FIG. 3 is a schematic view illustrating a part of a cross-section along line I-I of FIG. 1. In FIG. 3, the illustration of the metal pipe 10 on the outer periphery is omitted. As illustrated in FIG. 3, in the optical fiber fixing structure 1, the optical fiber 20 is arranged so that the center of the optical fiber 20 is eccentric to the center of the hole 11. That is, an eccentric distance L that is a distance between the center of the hole 11 and the center of the optical fiber 20 is larger than 0, for example, equal to or larger than a radius of the optical fiber 20. Moreover, in the optical fiber fixing structure 1, the optical fiber 20 is arranged so that an angle θ that is an angle formed by an eccentric direction d connecting the center of the hole 11 and the center of the optical fiber 20 and the axis AX1 is −22.5° or larger but not exceeding 22.5°.

The following will describe the effect of the optical fiber fixing structure 1. As illustrated in FIG. 3, stress from the metal pipe 10 and the low melting point glass 30 is not isotropic when the center of the optical fiber 20 is eccentric to the center of the hole 11. Thus, stress S1 substantially along the eccentric direction d is applied on the optical fiber 20.

Here, when stress is applied on the optical fiber 20 from the outside, the influence on the function of maintaining polarization varies with the direction from which stress is applied. For example, when stress is applied on the optical fiber 20 from a direction along the axis AX1 or the axis AX2 that is a polarization axis illustrated in FIG. 2, the stress contributes to the improvement of the function of maintaining polarization of the optical fiber 20. Meanwhile, when stress is applied on the optical fiber 20 from a direction along the axis AX3 or the axis AX4 in a direction inclined 45° to the polarization axis, the stress contributes to the deterioration of the function of maintaining polarization of the optical fiber 20.

In the optical fiber fixing structure 1, the angle θ illustrated in FIG. 3 is sufficiently small, and thus the stress S1 contributes to the improvement of the function of maintaining polarization of the optical fiber 20. Furthermore, in the optical fiber fixing structure 1, the eccentric distance L is equal to or larger than a radius of the optical fiber 20, whereby the stress S1 exerts the large effect of improving the function of maintaining polarization of the optical fiber 20. As a result, the deterioration of a polarization extinction ratio is suppressed in the optical fiber fixing structure 1.

Figure 4:
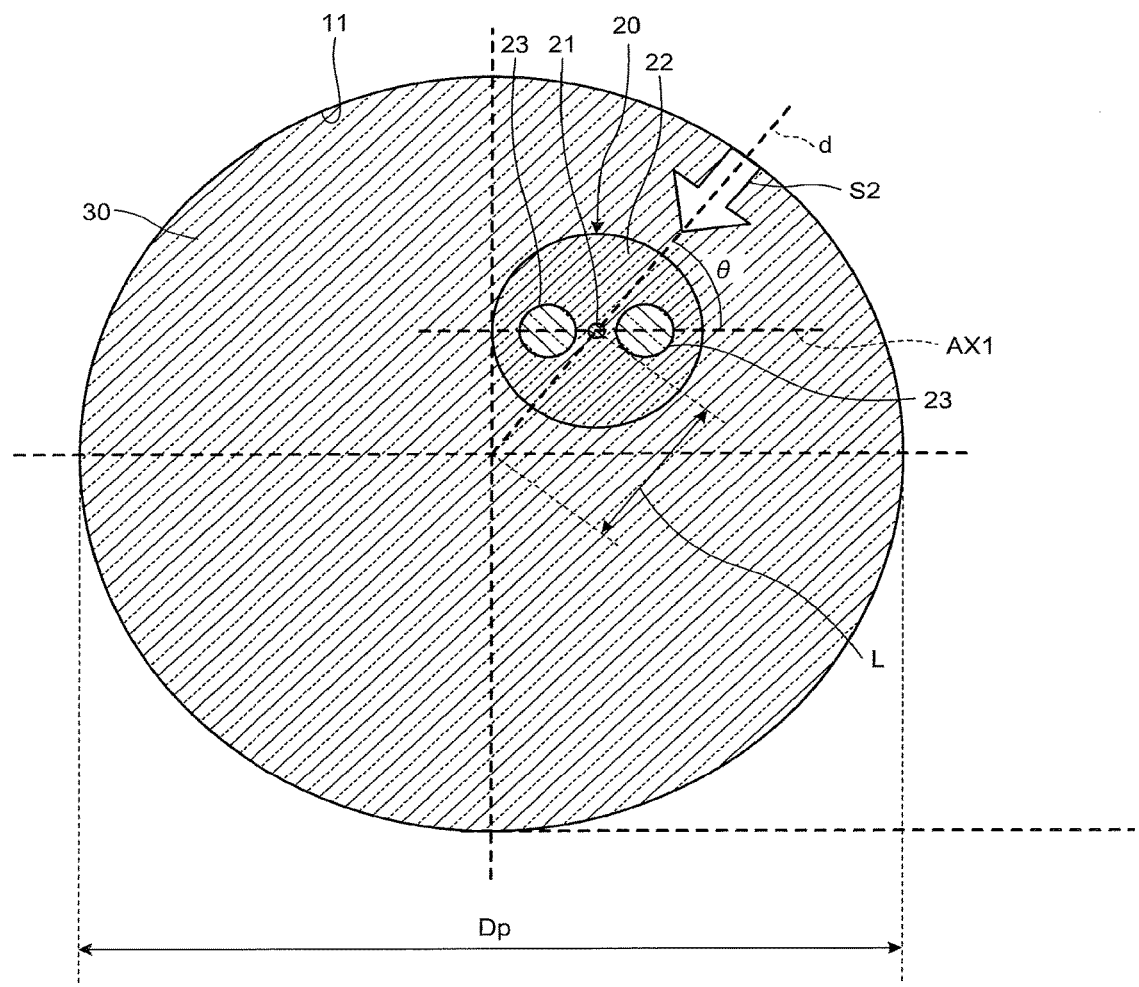
FIG. 4 is a schematic view illustrating a part of a cross-section along line I-I in an optical fiber fixing structure according to a comparative example.

By contrast, FIG. 4 illustrates an example in which the angle θ is large as a comparative example. FIG. 4 is a schematic view illustrating a part of a cross-section along line I-I in an optical fiber fixing structure according to a comparative example. When the angle θ is large as illustrated in FIG. 4, stress S2 contributes to the deterioration of the function of maintaining polarization of the optical fiber 20. Thus, in the optical fiber fixing structure of the comparative example, a polarization extinction ratio is deteriorated considerably.

Figure 5:
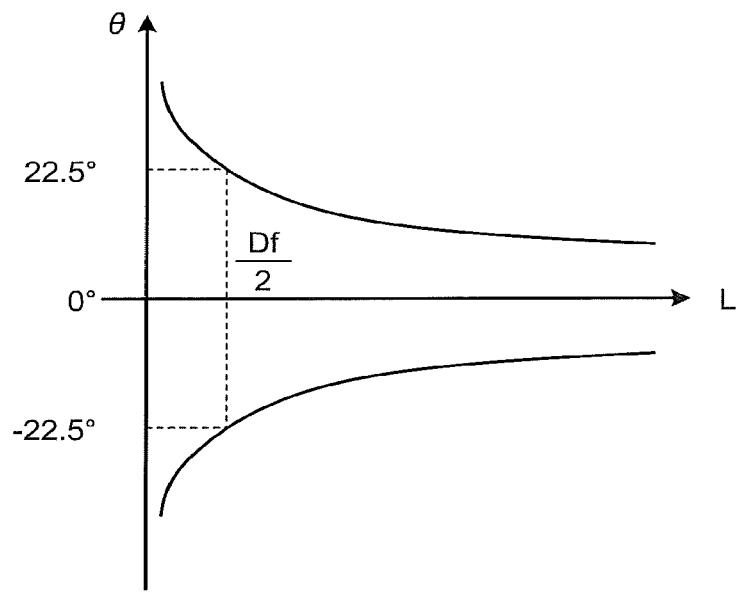
FIG. 5 is a diagram illustrating conditions of an eccentric direction and an eccentric distance with which an extinction ratio variation amount is equal to or smaller than 2 dB.
Figure 6:
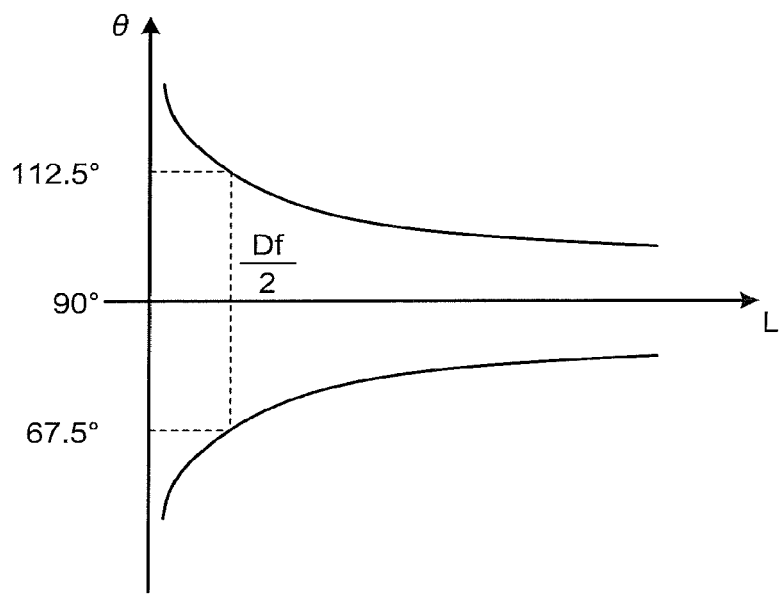
FIG. 6 is a diagram illustrating conditions of an eccentric direction and an eccentric distance with which an extinction ratio variation amount is equal to or smaller than 2 dB.

Here, it was confirmed by the experiment how small the angle θ is to sufficiently reduce a polarization extinction ratio in the optical fiber fixing structure 1. FIG. 5 and FIG. 6 are diagrams illustrating conditions of an eccentric direction and an eccentric distance with which an extinction ratio variation amount is equal to or smaller than 2 dB. The angle θ in FIG. 5 and FIG. 6 is an angle formed by the eccentric direction d and the axis AX1. In FIG. 5 and FIG. 6, the variation amount of a polarization extinction ratio in the optical fiber fixing structure 1 is equal to or smaller than 2 dB and the deterioration of a polarization extinction ratio is sufficiently small in an area inside curved lines (side close to the axes of the eccentric distance L and the angle θ). In FIG. 5, the deterioration of a polarization extinction ratio is small although the eccentric distance L is large to a certain extent as long as the angle θ is −22.5° or larger but not exceeding 22.5°. By contrast, in a range where the angle θ is smaller than −22.5° or larger than 22.5°, the polarization extinction ratio is deteriorated drastically as the eccentric distance L is larger, and exceeds 2 dB. In FIG. 6, when the angle θ is equal to or 67.5° but not exceeding 112.5°, that is, the angle formed by the eccentric direction d and the axis AX2 that is the second polarization axis is equal to or larger than −22.5° but not exceeding 22.5°, the deterioration of the polarization extinction ratio is small although the eccentric distance L is large to a certain extent. By contrast, in a range where the angle θ is smaller than 67.5° or larger than 112.5°, the polarization extinction ratio is deteriorated drastically as the eccentric distance L is larger, and exceeds 2 dB. In other words, the deterioration of a polarization extinction ratio is sufficiently small when the angle formed by the eccentric direction d and one of two polarization axes of the optical fiber 20 is equal to or larger than −22.5° but not exceeding 22.5°.

Note that the variation amount of the polarization extinction ratio may be smaller. The extinction ratio variation amount in the optical fiber fixing structure may be equal to or smaller than 2 dB because the reliability of a product using the optical fiber fixing structure 1 of the embodiment is secured.

A total extinction ratio required for an optical module using the optical fiber fixing structure 1 of the embodiment depends on a type of the optical module, and may be equal to or smaller than −25 dB to −13 dB.

Moreover, as illustrated in FIG. 5 and FIG. 6, the deterioration of a polarization extinction ratio is substantially same regardless of whether the angle formed by the eccentric direction d and the axis AX1 is equal to or larger than −22.5° but not exceeding 22.5°, or the angle formed by the eccentric direction d and the axis AX1 is equal to or larger than 67.5° but not exceeding 112.5°, that is, the angle formed by the eccentric direction d and the axis AX2 that is the second polarization axis is equal to or larger than −22.5° but not exceeding 22.5°. However, when polarization synthesis is performed in an optical module using the optical fiber fixing structure 1 of the embodiment, the angle formed by the eccentric direction d and the axis AX1 may be equal to or larger than −22.5° but not exceeding 22.5° because the polarization synthesis is easier. The suppression of deterioration of a polarization extinction ratio may suppress variation of optical output after polarization synthesis due to bending of the optical fiber 20.

As seen from FIG. 5 and FIG. 6, in the optical fiber fixing structure 1, the deterioration of a polarization extinction ratio is small although the center of the hole 11 is offset from the center of the metal pipe 10. Thus, fixation of the optical fiber 20 with the low melting point glass 30 may be performed in the state where the center of the optical fiber 20 is offset from the center of the hole 11. By contrast, in the conventional optical fiber fixing structure, it is necessary to fix the optical fiber with the low melting point glass in the state where the center of the hole of the metal pipe and the center of the optical fiber are aligned at high accuracy, and the polarization extinction ratio may be deteriorated unless the alignment is sufficiently accurate.

Moreover, the conventional optical fiber fixing structure may require a complicated structure to align the center of the hole of the metal pipe and the center of the optical fiber at high accuracy. By contrast, the optical fiber fixing structure 1 provides an optical fiber fixing structure in which the deterioration of a polarization extinction ratio is suppressed without requiring such a complicated structure.

Examples

Next, as examples and comparative examples, optical fiber fixing structures were produced actually to measure a variation amount of a polarization extinction ratio in the optical fiber fixing structures. FIG. 7 is a diagram illustrating an extinction ratio variation amount of optical fiber fixing structures according to examples and comparative examples. As illustrated in FIG. 7, an extinction ratio variation amount was measured for each of the examples and the comparative examples in which a diameter Dp of the small diameter portion 11a of the hole 11, an eccentric distance L, an eccentricity (2 L/Dp), and an angle θ were changed. As illustrated in FIG. 7, the diameter Dp of the small diameter portion 11a was set to 0.5 mm. The thermal expansion coefficient of the metal pipe 10 was set to $9.7 \times 10^{-6}/°$ C., the thermal expansion coefficient of the optical fiber 20 was set to $0.5 \times 10^{-6}/°$ C., and the thermal expansion coefficient of the low melting point glass 30 was set to $6.0 \times 10^{-6}/°$ C.

As seen from FIG. 7, the deterioration of a polarization extinction ratio is sufficiently small in Examples 1 to 3, while a polarization extinction ratio is considerably deteriorated in Comparative Example 1 and Comparative Example 2. This is because in Comparative Example 1 and Comparative Example 2, the angle θ is large and the stress contributes to the deterioration of the function of maintaining polarization of the optical fiber 20. By contrast, in Examples 1 to 3 in which the angle θ is in a range equal to or larger than −22.5° but not exceeding 22.5°, the stress contributes to the improvement of the function of maintaining polarization of the optical fiber 20, and thus the deterioration of the polarization extinction ratio is small. Moreover, in Examples and Comparative Examples, the eccentric distance L and the eccentricity (2 L/Dp) are also changed, but it is recognized that the deterioration of a polarization extinction ratio largely depends on the change of the angle θ, and other parameters do not considerably contribute to deterioration of a polarization extinction ratio. As disclosed in the preceding description, the optical fiber fixing structure 1 is an optical fiber fixing structure in which the deterioration of a polarization extinction ratio is suppressed by setting the angle θ to a certain value.

Figure 8:
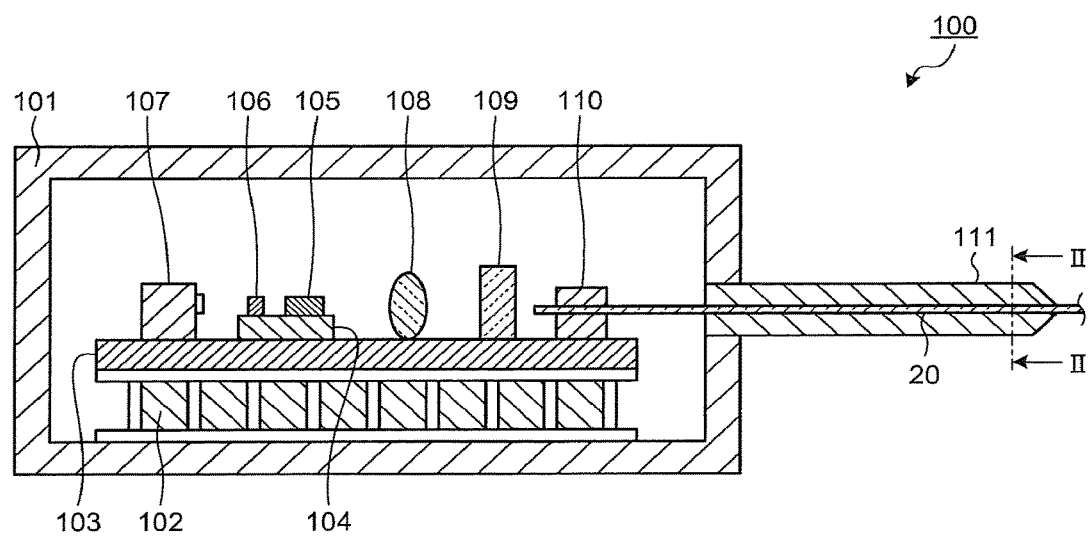
FIG. 8 is a schematic sectional side elevation illustrating a structure of a semiconductor laser module using the optical fiber fixing structure according to the embodiment.

The following will describe a semiconductor laser module using the optical fiber fixing structure 1 according to the embodiment of the disclosure. FIG. 8 is a schematic sectional side elevation illustrating a structure of a semiconductor laser module using an optical fiber fixing structure according to the embodiment. As illustrated in FIG. 8, a semiconductor laser module 100 includes a package 101 as a housing containing each unit, a temperature adjusting module 102 as a temperature control device arranged on an inner bottom surface of the package 101, a base 103 arranged on the temperature adjusting module 102, and a laser mount 104 arranged on the base 103. There are placed, on the laser mount 104, a semiconductor laser device 105 as a light emitting element, and a thermistor 106 arranged in the vicinity of the semiconductor laser device 105. There are placed, on the base 103, a photodetector 107 arranged on the side behind the semiconductor laser device 105, and a lens 108 and an isolator 109 arranged in this order on an optical path of a laser beam output by the semiconductor laser device 105. Furthermore, the optical fiber 20 is arranged on the light path of the laser beam. The optical fiber 20 is fixed by an optical fiber fixing pedestal 110 fixed on the base 103 and an optical fiber fixing part 111 fixed to the package 101. Note that the optical fiber fixing part 111 has a sectional structure illustrated in FIG. 1 although the illustration of the hole 11 is omitted in the optical fiber fixing part 111.

The package 101 may be formed of ceramic. The temperature adjusting module 102 may be a Peltier element. The temperature adjusting module 102 performs cooling and heating with the polarity of a current from a controller not illustrated. The temperature adjusting module 102 is controlled based on a value detected by the thermistor 106 to control a temperature of the laser mount 104, thereby adjusting a temperature of the semiconductor laser device 105. The semiconductor laser device 105 outputs a laser beam with a certain wavelength.

The photodetector 107 detects light leaking from the rear side of the semiconductor laser device 105 and inputs electrical signals in accordance with the intensity of the detected light to the controller. The lens 108 couples the laser beam output from the semiconductor laser device 105 with the optical fiber 20.

The isolator 109 prevents the light reflected by other optical parts and the like from returning to the semiconductor laser device 105. The isolator 109 may have a structure including a λ/4 plate and a polarizing plate that exclusively transmits light having a polarization plane along a horizontal direction. The laser beam output from the semiconductor laser device 105 has a polarization plane along a horizontal direction. In such a case, the polarization plane of the laser beam is rotated relative to a horizontal direction by the λ/4 plate before input to the optical fiber 20. Note that the isolator 109 may have a multi-stage structure.

Figure 9:
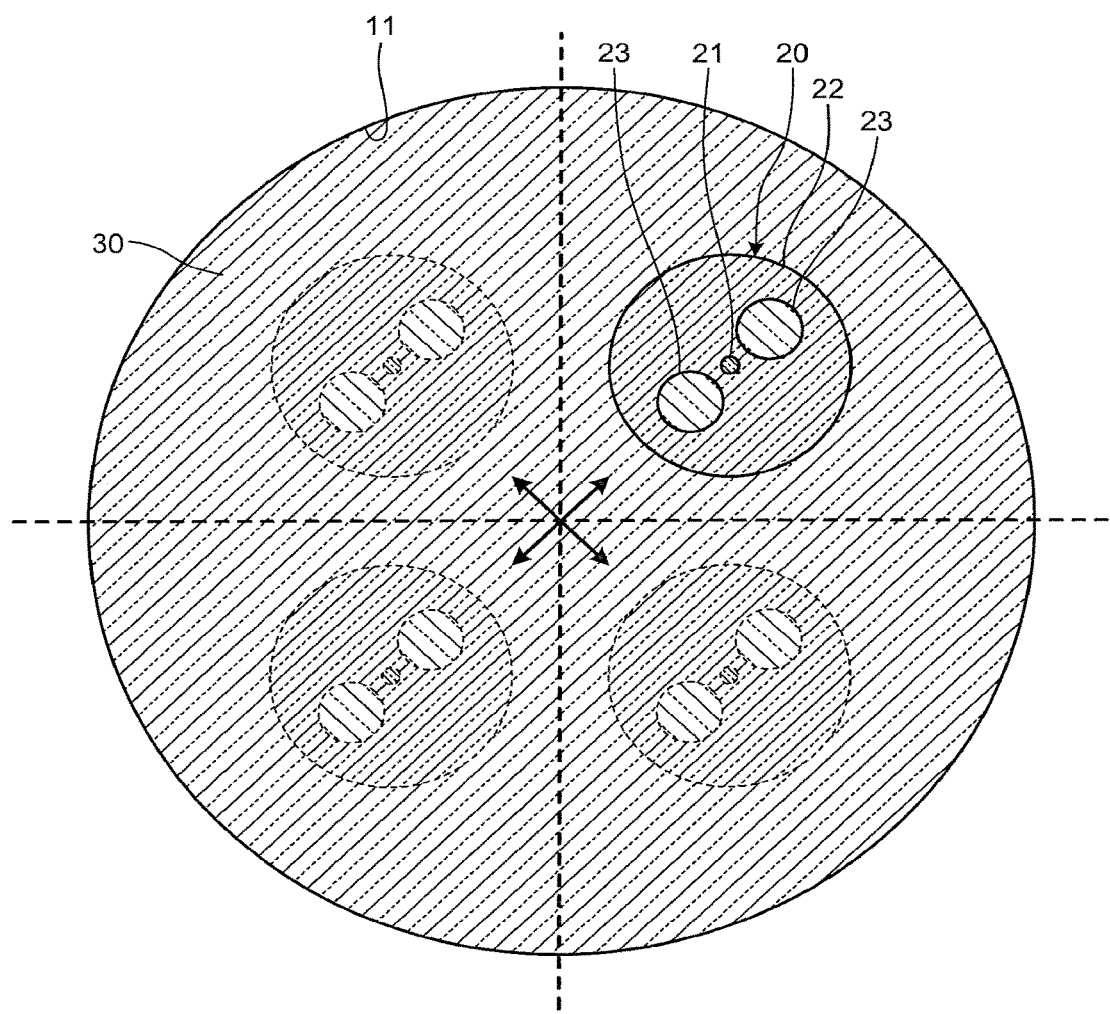
FIG. 9 is a schematic view illustrating a part of a cross-section along line II-II of FIG. 8.

The optical fiber fixing part 111 includes therein the optical fiber fixing part 1 (not illustrated in FIG. 8). FIG. 9 is a schematic view illustrating a part of a cross-section along line II-II of FIG. 8. In FIG. 9, the illustration of the metal pipe 10 on the outer periphery is omitted. Regarding the laser beam having a polarization plane along a horizontal direction that is output from the semiconductor laser device 105, the polarization plane is rotated by 45° by the λ/4 plate of the isolator 109. Thus, the optical fiber 20 is arranged so that the polarization axis is 45° relative to a horizontal direction. Then, the optical fiber 20 is arranged so that an angle formed by the polarization axis and an eccentric direction connecting the center of the hole 11 and the center of the optical fiber 20 is −22.5° or larger but not exceeding 22.5° and the center of the optical fiber 20 is offset from the center of the hole 11. The eccentric direction of the optical fiber 20 may be a direction illustrated by a solid line in FIG. 9, and may be also directions illustrated by broken lines in FIG. 9. The other structures of the optical fiber fixing structure 1 are same as the embodiment, and thus the explanation thereof is omitted.

As described above, the semiconductor laser module 100 is a semiconductor laser module having a desirable polarization extinction ratio because the optical fiber fixing structure 1 suppresses deterioration of the polarization extinction ratio.

Figure 10:
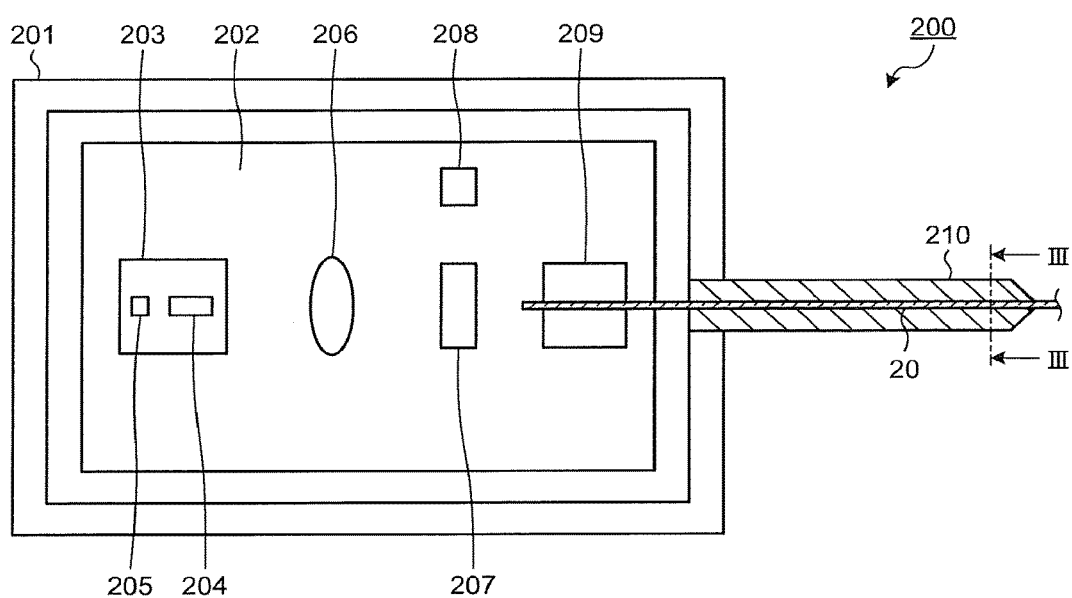
FIG. 10 is a schematic partial cutout view illustrating a structure of another semiconductor laser module using the optical fiber fixing structure according to the embodiment viewed from the upper side.

The following will describe another semiconductor laser module using the optical fiber fixing structure 1 according to the embodiment of the disclosure. FIG. 10 is a schematic partial cutout view illustrating a structure of another semiconductor laser module using the optical fiber fixing structure according to the embodiment viewed from the upper side. As illustrated in FIG. 10, a semiconductor laser module 200 includes a package 201 as a housing containing each unit, a base 202 arranged on an inner bottom surface of the package 201, and a laser mount 203 arranged on the base 202. There are placed, on the laser mount 203, a semiconductor laser device 204 as a light emitting element, and a thermistor 205 arranged in the vicinity of the semiconductor laser device 204. There are placed, on the base 202, a lens 206 and a beam splitter 207 arranged in this order on an optical path of the laser beam output by the semiconductor laser device 204. A part of the laser beam diverges at the beam splitter 207 and inputs to a photodetector 208. Meanwhile, the optical fiber 20 is arranged on the optical path of the laser beam transmitting the beam splitter 207. The optical fiber 20 is fixed by an optical fiber fixing pedestal 209 fixed on the base 202 and an optical fiber fixing part 210 fixed to the package 201. Note that the optical fiber fixing part 210 has a sectional structure illustrated in FIG. 1 although the illustration of the hole 11 is omitted in the optical fiber fixing part 210.

The package 201 may be formed of ceramic. The semiconductor laser device 204 includes a plurality of distributed feedback (DFB) type laser elements with a different oscillation wavelength in a range of about 3 to 4 nm, an optical coupler, and a semiconductor optical amplifier (SOA). The semiconductor laser device 204 roughly adjusts a wavelength by selecting a DFB laser element to be driven, finely adjusts the wavelength through temperature change by the temperature adjusting module not illustrated, and operates, as a whole, as a wavelength-tunable light source in a continuous wavelength range.

The lens 206 couples the laser beam output from the semiconductor laser device 204 with the optical fiber 20. The photodetector 208 detects the laser beam diverging at the beam splitter 207 and inputs electrical signals in accordance with the detected strength to the controller not illustrated.

Figure 11:
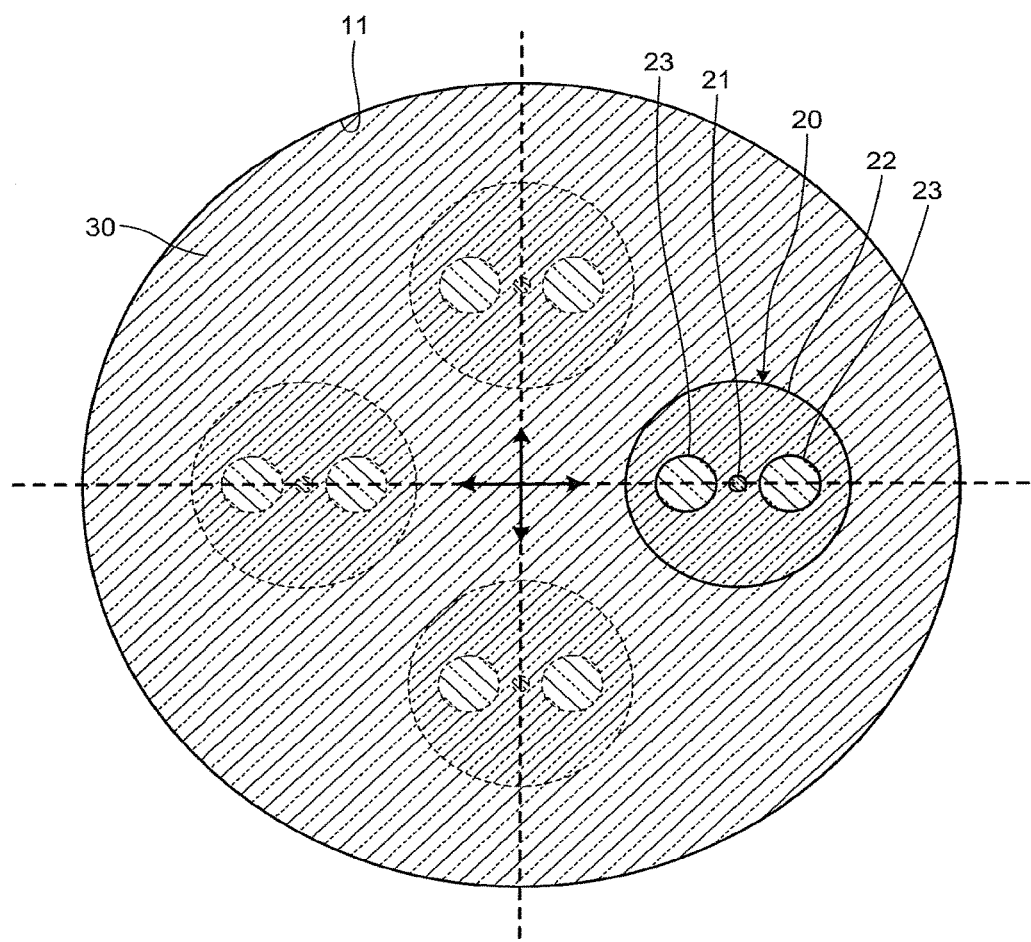
FIG. 11 is a schematic view illustrating a part of a cross-section along line III-III of FIG. 10.

The optical fiber fixing part 210 has therein the optical fiber fixing structure 1 (not illustrated in FIG. 10). FIG. 11 is a schematic view illustrating a part of a cross-section along line III-III of FIG. 10. In FIG. 11, the illustration of the metal pipe 10 on the outer periphery is omitted. The laser beam having a polarization plane in a horizontal direction that is output from the semiconductor laser device 204 is input with its polarization as it is to the optical fiber 20. Thus, the optical fiber 20 is arranged so that any of the polarization axes is along a horizontal direction. Then, the optical fiber 20 is arranged so that an angle formed by the polarization axis and the eccentric direction connecting the center of the hole 11 and the center of the optical fiber 20 is −22.5° or larger but not exceeding 22.5° and the center of the optical fiber 20 is offset from the center of the hole 11. For example, the eccentric direction of the optical fiber 20 may be a direction illustrated by a solid line in FIG. 11, and may be also directions illustrated by broken lines in FIG. 11. The other structures of the optical fiber fixing structure 1 are same as the embodiment, and thus the explanation thereof is omitted.

As described above, the semiconductor laser module 200 is a semiconductor laser module having a desirable polarization extinction ratio because the optical fiber fixing structure 1 suppresses deterioration of the polarization extinction ratio.

Note that the above-described embodiment describes the case in which the optical fiber 20 is a polarization maintaining optical fiber having two polarization planes, but the optical fiber 20 may be a single polarization optical fiber having one polarization plane. In the latter case, it is only necessary that the angle formed by the eccentric direction d and the polarization plane is −22.5° or larger but not exceeding 22.5°, or 67.5° or larger but not exceeding 112.5°.

As described above, for example, the optical fiber fixing structure according to the disclosure may be applied to a semiconductor laser module.

The disclosure may provide an optical fiber fixing structure in which the deterioration of a polarization extinction ratio is suppressed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber fixing structure, comprising:
a cylindrical member;
a single optical fiber inserted into a hole of the cylindrical member; and
a fixing material configured to fix the cylindrical member and the single optical fiber, wherein
the fixing material is a low melting point glass that softens at 600° C. or lower,
the single optical fiber is a polarization maintaining optical fiber having a polarization axis,
a center of the single optical fiber is arranged such that an eccentric distance between a center of the hole and the center of the single optical fiber is equal to or larger than a radius of the single optical fiber, and
an angle formed by an eccentric direction, connecting the center of the hole and the center of the single optical fiber, and the polarization axis is −22.5° to 22.5°, or 67.5° to 112.5°.

2. The optical fiber fixing structure according to claim 1, wherein
the single optical fiber includes a core and a cladding,
the cladding including a pair of stress imparting parts arranged axisymmetrically relative to a symmetrical axis passing a center of the core,
the polarization axis includes a first polarization axis and a second polarization axis that is orthogonal to the first polarization axis,
the first polarization axis is an axis in a direction orthogonal to the symmetrical axis, and
the second polarization axis is an axis in a direction parallel to the symmetrical axis.

3. The optical fiber fixing structure according to claim 1, wherein a distance between the center of the hole and the center of the single optical fiber is equal to or larger than a radius of the single optical fiber.

4. The optical fiber fixing structure according to claim 1, wherein
the hole includes:
a small diameter portion with a diameter of the hole that is constant and smaller than other parts; and
an enlarged diameter portion that is arranged on both sides of the small diameter portion and gradually becomes larger in diameter of the hole along a direction away from the small diameter portion, and
the fixing material fixes the cylindrical member and the single optical fiber at the small diameter portion.

5. The optical fiber fixing structure according to claim 1, wherein the fixing material is configured to hermetically seal the hole.

6. The optical fiber fixing structure according to claim 1, wherein a diameter of a part with a smallest diameter of the hole in a fixing part of the cylindrical member and the optical fiber is equal to or larger than twice but not exceeding eight times of a diameter of the optical fiber.

7. The optical fiber fixing structure according to claim 1, wherein a thermal expansion coefficient of the cylindrical member is larger than a thermal expansion coefficient of the fixing material.

* * * * *